United States Patent
Patidar (10) Patent No.: US 10,110,564 B2
(45) Date of Patent: Oct. 23, 2018

(54) DETECTING APPLICATION STATE USING A DNS-CONTROLLED PROXY

(71) Applicant: Adobe Systems Incorporated, San Jose, CA (US)

(72) Inventor: Mansukh Patidar, Greater Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 185 days.

(21) Appl. No.: 14/882,892

(22) Filed: Oct. 14, 2015

(65) Prior Publication Data

US 2017/0111322 A1 Apr. 20, 2017

(51) Int. Cl.
| | |
|---|---|
| *H04L 9/32* | (2006.01) |
| *H04L 29/06* | (2006.01) |
| *H04L 29/12* | (2006.01) |
| *H04L 29/08* | (2006.01) |
| *G06F 8/61* | (2018.01) |

(52) U.S. Cl.
CPC ............ *H04L 63/0281* (2013.01); *G06F 8/61* (2013.01); *H04L 61/1511* (2013.01); *H04L 63/0823* (2013.01); *H04L 63/18* (2013.01); *H04L 67/02* (2013.01); *H04L 67/141* (2013.01); *H04L 61/305* (2013.01); *H04L 63/168* (2013.01)

(58) Field of Classification Search
CPC ... H04L 63/0281; G06F 21/556; G06F 21/606
USPC .......................................................... 713/175
See application file for complete search history.

(56) References Cited

U.S. PATENT DOCUMENTS

| | | | | |
|---|---|---|---|---|
| 6,151,624 A | * | 11/2000 | Teare ................ | G06F 17/30887 707/999.005 |
| 6,418,554 B1 | * | 7/2002 | Delo ........................ | G06F 8/61 717/174 |
| 6,754,896 B2 | * | 6/2004 | Mishra ...................... | G06F 8/61 709/224 |
| 7,769,820 B1 | * | 8/2010 | Spies ...................... | H04L 63/08 709/218 |
| 8,856,869 B1 | * | 10/2014 | Brinskelle ............... | H04L 63/08 726/12 |
| 9,648,044 B2 | * | 5/2017 | Islam ...................... | H04L 63/20 |
| 2011/0255742 A1 | * | 10/2011 | Horie ...................... | A63F 13/42 382/103 |
| 2015/0052258 A1 | * | 2/2015 | Johnson ................ | H04L 67/141 709/228 |

* cited by examiner

*Primary Examiner* — Dant B Shaifer Harriman
(74) *Attorney, Agent, or Firm* — Wolfe-SBMC (57) ABSTRACT

Detecting an application state using a DNS-controlled proxy is described. In one or more embodiments, a proxy on a computer establishes a first secure connection with a browser and the proxy establishes a second secure connection with a web server. The proxy forwards a request for a test asset from the browser to the web server. In response to the request, the web server responds with the test asset, which is sent via the proxy to the browser. The browser attempts to load the test asset to determine if a desktop application is installed and running on the computer.

20 Claims, 5 Drawing Sheets

DETECTING APPLICATION STATE USING A DNS-CONTROLLED PROXY

BACKGROUND

Providers of software applications use the Internet to securely deliver and streamline the installation of software for users. A desktop application installed on a user's computer manages the software download and installation process, which reduces the amount of user interaction required to download and install software. A web page on the provider's web site relies on a browser and browser plug-in on the user's computer to determine that the desktop application is available to manage the software download and installation process. By using the browser plug-in, the web site determines the installation state of the desktop application without requiring user intervention to download and run an installer program for the new software.

To improve browser security, many browser vendors are phasing out support of browser plug-ins. Without the availability of a browser plug-in, the installation state of the desktop application cannot be determined and the user may be required to perform additional operations to download and install new software. Alternative approaches are needed to provide mechanisms to determine desktop application installation state for the software download and installation process.

SUMMARY

Detecting application state using a DNS-controlled proxy is described. In one or more embodiments, a proxy on a computer establishes a first secure connection with a browser and the proxy establishes a second secure connection with a web server. The browser sends a request for a test asset over the first secure connection to the proxy. The proxy forwards the request for the test asset to the web server using the second secure connection. In response to the request, the web server responds with the test asset, which is sent via the proxy to the browser. The browser attempts to load the test asset to determine if the desktop application is installed and running on the computer.

Additionally, a system for determining application state on a computer has a proxy and a browser. The browser sends a detection URL to a Domain Name Service (DNS) server to obtain the address of the proxy. The browser and the proxy establish a first secure connection between the browser and the proxy. The proxy sends a connection URL to the DNS server to obtain the address of a web server. The proxy receives the address of the web server from the DNS server and uses the received address to establish a second secure connection between the proxy and the web server. The browser sends a request for a test asset to the web server via the proxy. The web server responds with the test asset, which is sent via the proxy to the browser. The browser executes a script to load the test asset and determine from the result of loading the asset to determine if a desktop application is installed and running on the computer.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A provider of software applications may make the software applications available over a network, such as the Internet, from one or more web pages of the provider's web site. To simplify the installation of a software application from the web site, the provider uses a desktop application to manage the download and installation process. The desktop application is an application that is installed on a user's computer to simplify downloading and installation of software applications for the user. The desktop application may also provide other functions as described below. The software applications may be any standalone application or one of a suite of related applications, such as a word processing application, an image editing application, and so forth.

The web page for installation of a software application relies on the desktop application being installed and/or running on the computer. The web page includes a script or program code, such as JavaScript code, for execution in the browser to determine if the desktop application is installed on the computer. If the desktop application is installed, the desktop application can download, update, and/or install the software application without requiring a user of the computer to perform additional installation tasks, such as downloading and running an installer program to install the software application.

If the code executed by the browser determines that the desktop application is not installed (e.g., the first time a user installs a software application from the provider), the web page will present a selectable option for the user to download an installer program for the desktop application. When the user runs the installer program, the desktop application is downloaded and installed on the computer, and once installed; the desktop application is configured to run on the computer. The desktop application includes a proxy that is installed on the computer, which is accessed by the browser using a Domain Name System (DNS) lookup to obtain the Internet Protocol (IP) address for the proxy. The desktop application may run as a background task whenever the computer is running, and/or may be configured to run as a desktop application for access to software applications from the provider, and so forth. For example, the desktop application may be the Adobe® Creative Cloud® Desktop Application that enables the installation of software applications such as Photoshop®, Illustrator®, Lightroom®, and the like.

In embodiments, the proxy is used to provide authenticated and secure connections to forward communications between the browser on the computer and web servers of the software provider. The proxy provides a secure communication path for software downloads from the software provider. The use of the proxy with connections, authenticated and secured using Secure Sockets Layer (SSL) certificates, eliminates dependency on browser plug-ins and the security issues associated with them. The use of the proxy prevents malicious attacks on the computer and data. The use of the proxy, based on standard networking and security technologies, provides a single, secure solution that is independent of a particular browser or operating system on the computer.

In embodiments, the proxy is installed and runs as a background process on the computer, so that the determination of the installation state is always available for the software download process. The use of the desktop application and the proxy in the software download process eliminates the need for the user to perform additional steps, such as downloading and running an installer program. This results in an improved user experience for software downloads and promotes broader and more rapid adoption of new software programs for the software provider.

Example Environment

Figure 1:
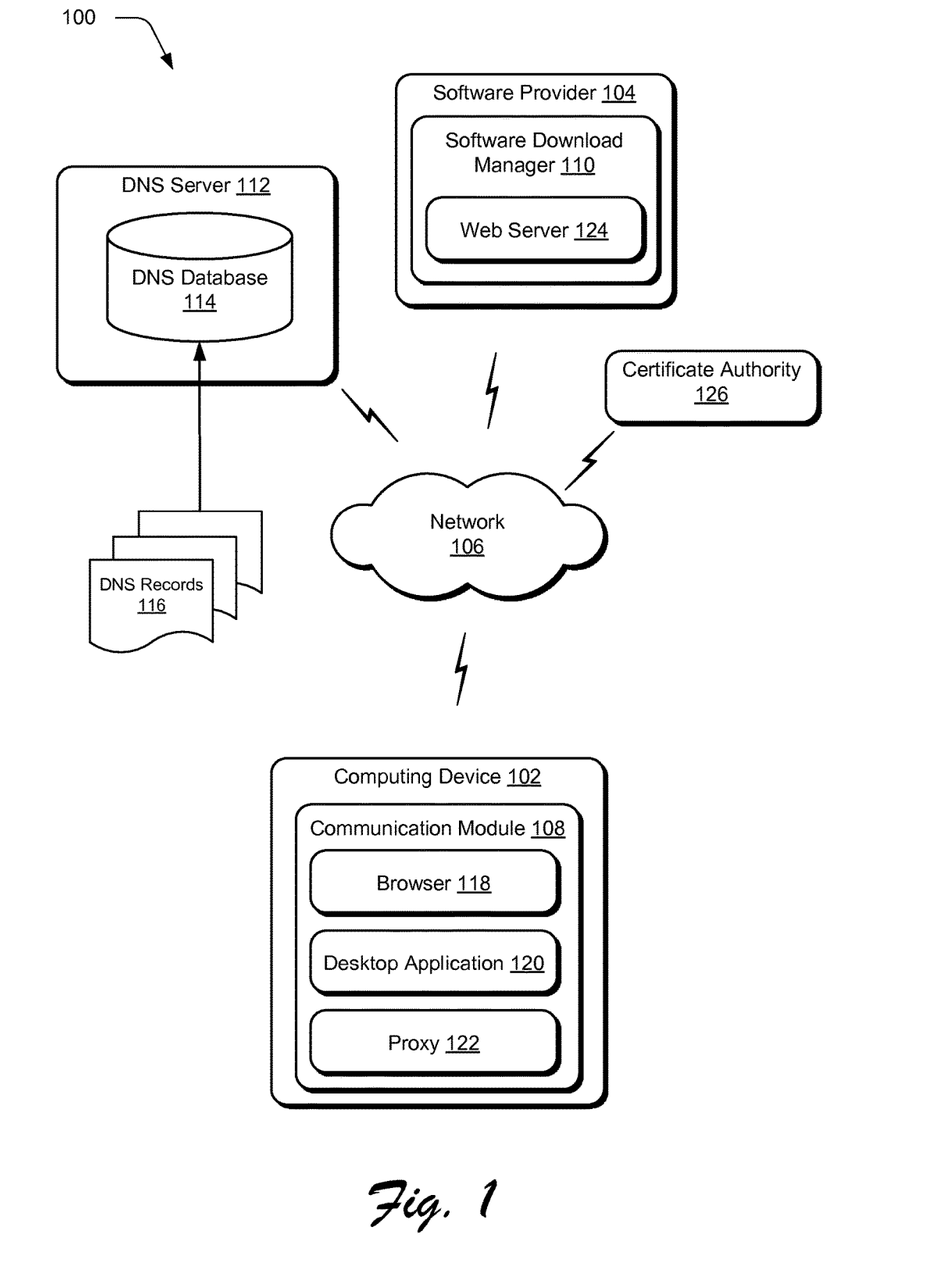
FIG. 1 illustrates detecting application state using a DNS-controlled proxy from FIG. 1 in accordance with one or more embodiments.

FIG. 1 is an illustration of an environment 100 in an example embodiment of detecting an application state using a DNS-controlled proxy described herein. The illustrated environment 100 includes a computing device 102 and a software provider 104 that are communicatively coupled via a network 106. The computing device 102 as well as computing devices that implement the software provider 104 may be configured in a variety of ways. For example, the computing device 102 may be a desktop computer, a laptop computer, a mobile device (e.g., assuming a handheld configuration such as a tablet or mobile phone), and so forth. Additionally, a computing device may be representative of a plurality of different devices, such as multiple servers of the software provider 104 utilized by a business to perform operations "over the cloud" as further described in relation to FIG. 4.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The computing device 102 is also illustrated as including a communication module 108. The communication module 108 is representative of functionality to communicate via the network 106, such as with one or more services of the software provider 104. As such, the communication module 108 may be configured in a variety of ways. For example, the communication module 108 may be configured as a browser that is configured to "surf the web." The communication module 108 may also be representative of network access functionality that may be incorporated as part of an application, e.g., to provide network-based functionality as part of the application, an operating system, and so on. Thus, functionality represented by the communication module 108 may be incorporated by the computing device 102 in a variety of different ways.

The software provider 104 is representative of functionality to provide one or more network-based services (e.g., web services). For instance, the network-based services may be configured to support providing software applications to customers of the software provider 104. These services include validating user identifiers (IDs) for customers to associate a session with the software provider 104 to a customer's user account, determining that the computing device 102 has installed a desktop application for the software downloads and installations, providing software applications that can be downloaded from the software provider 104 to the computing device 102, and so forth.

A software download manager 110 is configured to manage processing of data and/or content as a part of downloading software requested by the computing device 102. A user may wish to communicate with the software provider 104 to request service such as downloading a new software application. The software download manager 110 processes the user's request and, if needed, communicates the request to an appropriate entity to properly service the request.

The illustrated environment 100 includes a Domain Name System (DNS) server 112 that is communicatively coupled to the network 106. The DNS server 112 is representative of any of a number of DNS servers 112 that are connected to the network 106. The DNS server 112 provides various information associated with domain names, such as translations from domain names to numerical Internet Protocol (IP) addresses. The DNS server 112 may be connected to a public network, such as the Internet, or a private network. The DNS server 112 includes a DNS database 114 that stores DNS records 116 containing information associated with domain and subdomain names, such as the mappings of the domain and subdomain names to associated numerical Internet Protocol (IP) addresses.

The communication module 108 includes a browser 118, a desktop application 120, and a proxy 122. The browser 118 is any suitable web browser, such as Chrome™, Firefox®, Safari®, and so forth. The desktop application 120 downloads, updates, and/or installs a software application without requiring a user to perform additional installation tasks. The desktop application 120 may also include other functions, such as launching software applications, synchronizing and sharing files, searching for images or other media, and so forth.

The proxy 122 is a server for a networking port that relays communications between the browser 118 and servers connected via the network 106 using any suitable protocol. By way of example and not limitation, the proxy 122 is a Transmission Control Protocol (TCP) server that sends all incoming TCP traffic received from the browser 118 to the software provider 104 and all responses from the software provider 104 are sent to the browser 118.

In embodiments, the proxy 122 is setup as a system service or process during the installation of the desktop application 120. The proxy 122 runs in the background on the computing device 102, regardless of whether the desktop application 120 is running or not. The proxy 122 acts as a TCP server for a specific port. For example, the proxy 122 is a TCP server for the port 15151 of the localhost (127.0.0.1:15151).

The software download manager 110 includes a web server 124. In order to assure the authenticity of software downloads, the web server 124 can be authenticated with a Secure Sockets Layer (SSL) certificate, as described below. Although the software download manager 110 is illustrated as including the web server 124, other configurations are contemplated, such as the web server 124 implemented separately from the software download manager 110.

In an example embodiment of detecting application state using a DNS-controlled proxy, the software provider creates and inserts DNS records 116 in the DNS database 114 of the DNS server 112. The DNS records 116 are propagated to other DNS servers 112 connected to the network 106, as is well known in the art.

In embodiments, the software provider creates two DNS records 116. A first DNS record 116 is created for a detection Uniform Resource Locator (URL) and the second DNS record 116 is created for a connection URL. Both the detection URL and the connection URL are subdomains of a common top-level domain. The first DNS record 116 for the detection URL maps the detection URL to an IP address assigned to the localhost of the computing device 102, typically IP address 127.0.0.1. The second DNS record 116 for the connection URL maps the connection URL to the IP address of the web server 124. For example, the detection URL is detect.adobe.com and the connection URL is connect.adobe.com, both of which are subdomains of the top-level domain adobe.com.

A Certificate Authority (CA) 126 is connected to the network 106. The CA 126 validates certificates that are used to authenticate web sites and establish secure communications between web sites and browsers using Secure Socket Layer (SSL) and/or Transport Layer Security (TLS) protocols. In embodiments, when an SSL certificate is generated to sign the top-level domain, the SSL certificate also authenticates the subdomains of that top-level domain. For example, an SSL certificate is generated to sign the *.adobe.com top-level domain. The SSL certificate for *.adobe.com can also be used to authenticate for the subdomains detect.adobe.com and connect.adobe.com. The browser 118 sends an SSL certificate for *.adobe.com to the CA 126 and the CA 126 sends a certificate accept response to the browser 118, if the SSL certificate is valid.

Figure 2A:
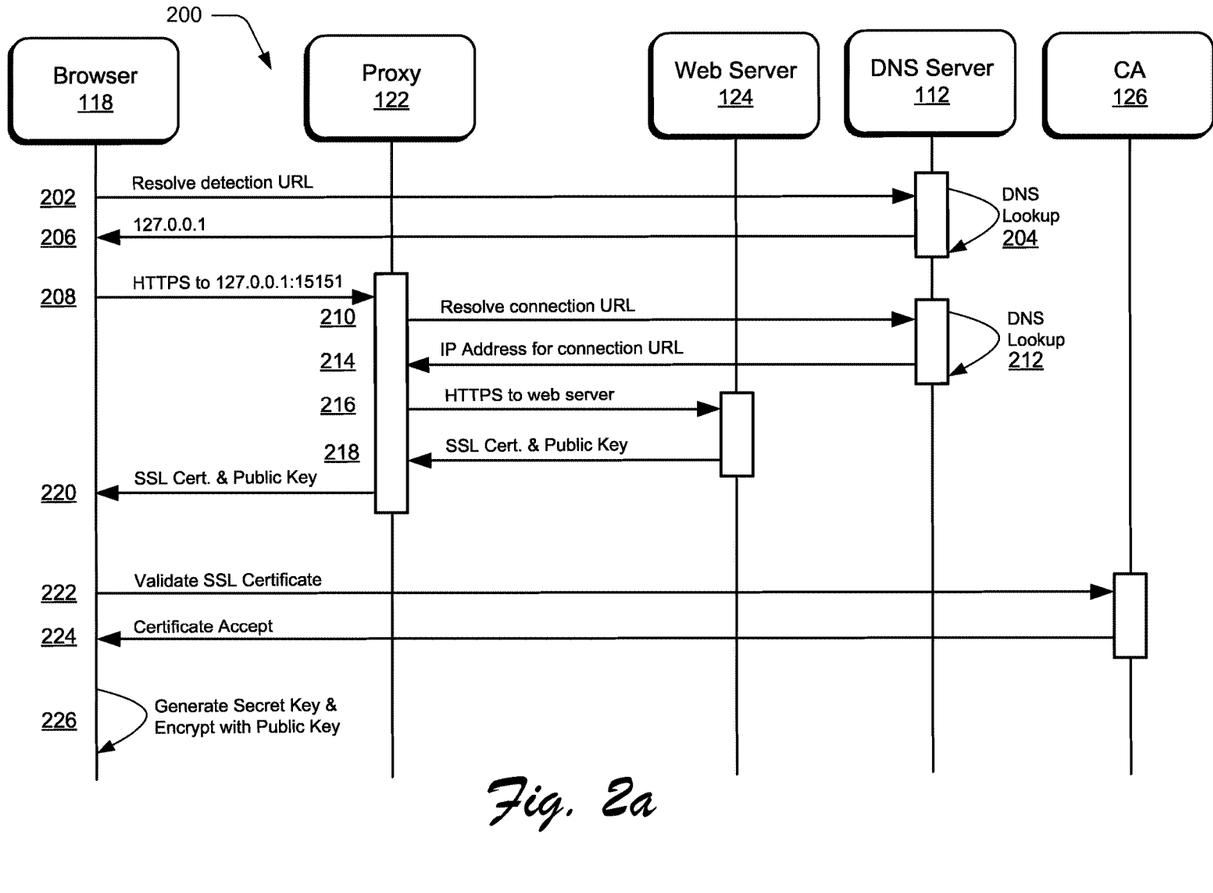
FIG. 2a is an example of data transactions between devices in a network environment to establish communication connections in accordance with embodiments of detecting application state using a DNS-controlled proxy.

FIG. 2a illustrates, at 200, the beginning of the software download process and detecting an application state using a DNS-controlled proxy, by showing the transactions between the devices in the environment 100. The software download process begins when a user visits a web site, such as www.adobe.com, and decides to download a software application. Alternatively, an application or process automatically determines to download a new or updated software application. A script is included in a web page loaded by the browser 118. The browser 118 runs the script, which attempts to load a test asset using the detection URL. The test asset may be any suitable type of asset, such as an image, text, a video, and so forth. For example, the script included in the web page attempts to load the test asset, detect.png, from http://detect.adobe.com:15151/detect.png.

At 202 in FIG. 2a, the browser 118 connects with the DNS server 112 to resolve the detection URL. At 204, the DNS server 112 performs a lookup for the detection URL and, at 206, the DNS server 112 returns an IP address associated with the detection URL from the DNS record 116 for the detection URL. For example, the browser 118 provides the URL detect.adobe.com to the DNS server 112, the DNS server 112 performs a lookup for detect.adobe.com, the DNS server 112 responds with the IP address mapped to detect.adobe.com, and the browser 118 receives the IP address 127.0.0.1 from the DNS server 112.

At 208, the browser 118 establishes a TCP connection to a port of the proxy 122 as a part of establishing a secure session to download the software application. For example, the browser 118 establishes a TCP connection to the proxy 122 on port 15151 of the local host (127.0.0.1:15151) to establish a secure connection using Hypertext Transfer Protocol (HTTPS).

In response to the browser 118 establishing the secure connection with the proxy 122, the proxy 122 connects with the DNS server 112, at 210, to resolve connection URL. At 212, the DNS server 112 performs a lookup for the connection URL and, at 214, the DNS server 112 returns an IP address associated with the connection URL from the DNS record 116 for the connection URL. For example, the browser 118 provides the URL connect.adobe.com to the DNS server 112, the DNS server 112 performs a lookup for connect.adobe.com, the DNS server 112 responds with the IP address mapped to connect.adobe.com, and the browser 118 receives the IP address for connect.adobe.com from the DNS server 112.

If the attempt to establish the secure connection between the browser 118 and the proxy 122 fails, this may indicate that the desktop application 120 is not installed and/or the proxy 122 is not installed or running. In this exception case, the user may proceed with downloading software by downloading and running an installer program from the web server 124 to install the desktop application 120, the proxy 122, and/or a software application. For example, the script may present a selectable option in the browser 118 that the user can select in order to download the installer program.

The proxy 122 establishes a secure connection with the web server 124, using the IP address for the connection URL, at 216. At 218, the web server 124 responds by sending an SSL certificate and a public encryption key for the top-level domain associated with the web server 124 to the proxy 122. At 220, the proxy 122 sends the received SSL certificate and the public encryption key to the browser 118. For example, the proxy 122 establishes the HTTPS connection to connect.adobe.com, which is hosted by the web server 124, and the proxy 122 receives the SSL certificate and the public encryption key for *.adobe.com from the web server 124 for connect.adobe.com. The proxy 122 sends the received SSL certificate and the public encryption key for *.adobe.com to the browser 118.

At 222, the browser 118 sends the received SSL certificate to the certificate authority 126 for validation. At 224, if the CA 126 determines that the SSL certificate is valid, the CA 126 sends an indication to the browser 118 that the certificate is valid. For example, the browser 118 sends the SSL certificate for *.adobe.com to the certificate authority 126, the CA 126 determines that the SSL certificate for *.adobe.com is valid, the CA 126 sends a certificate accept message to the browser 118, and the browser 118 receives the certificate accept message from the CA 126 indicating that the certificate is valid. As noted above, since the SSL certificate authenticates and enables secure communication with the top-level domain, the SSL certificate also authenticates and enables secure communication with subdomains of the top level domain. For example, the SSL certificate that authenticates *.adobe.com, also authenticates detect.adobe.com and connect.adobe.com, ensuring that the software download process is conducted with authenticated resources of the software provider and is secured by encryption.

At 226, the browser 118 generates a secret, symmetric encryption key and encrypts the symmetric encryption key with the public encryption key received from the web server 124. For example, the browser 118 generates the symmetric encryption key and encrypts the generated symmetric encryption key using the public encryption key for *.adobe.com.

Figure 2B:
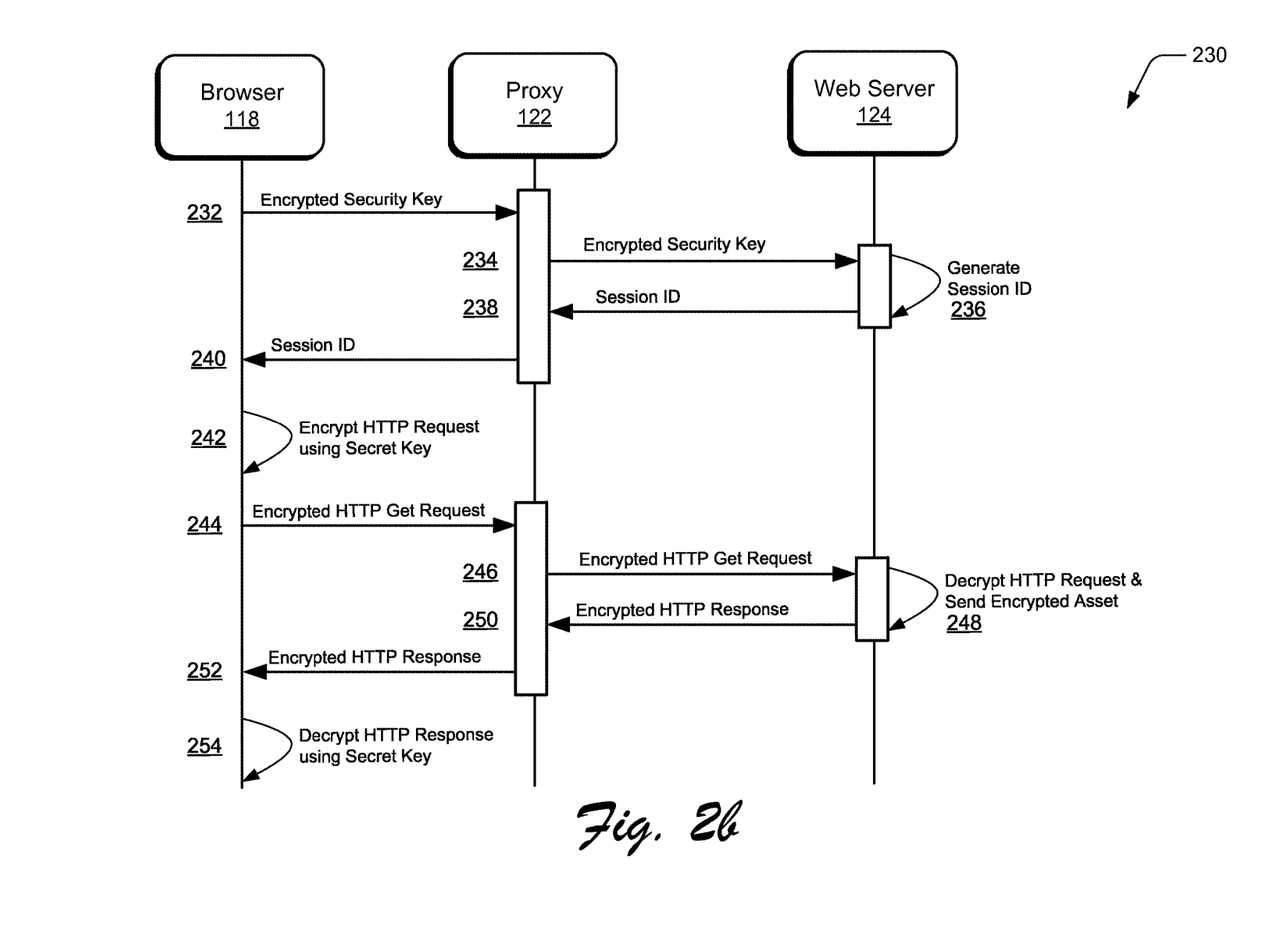
FIG. 2b is a continuation of the example of data transactions between devices in a network environment to securely exchange data in accordance with embodiments of detecting application state using a DNS-controlled proxy.

FIG. 2b illustrates, at 230, the continuation of the software download process and detecting an application state using a DNS-controlled proxy, by showing the transactions between the devices in the environment 100. The DNS server 112 and the certificate authority 126 are omitted for the sake of clarity in the illustration in FIG. 2b.

At 232, the browser 118 sends the encrypted symmetric encryption key to the proxy 122. At 234, the proxy 122 sends the encrypted symmetric encryption key to the web server 124. At 236, in response to receiving the encrypted symmetric encryption key from the proxy 122, the web server 124 generates a session identifier (session ID). At 238, the web server 124 sends the session ID to the proxy 122. At 240, the proxy 122 sends the session ID received from the web server 124 to the browser 118.

At 242, the browser 118 creates an HTTP GET request for the test asset, for example /detect.png, and encrypts the HTTP GET request using the symmetric encryption key. At 244, the browser 118 sends the encrypted HTTP GET request to the proxy 122, and in turn the proxy 122 sends the encrypted HTTP GET request to the web server 124, at 246. Although an HTTP GET web call is illustrated at 242, any suitable web call, such as an HTTP POST or an HTTP PUT can be used to request the test asset. Additionally, a web call such as an HTTP HEAD can be used to request the header information for the test asset.

At 248, the web server 124 decrypts the encrypted HTTP GET request and, at 250, the web server 124 sends a response including an encrypted version of a test asset to the proxy 122. At 252, the proxy 122 sends the encrypted test asset received from the web server 124 to the browser 118. At 254, the browser 118 decrypts the encrypted test asset received from the proxy 122.

After the browser 118 decrypts the encrypted test asset, the web page in the browser 118 attempts to load the decrypted test asset to validate that the desktop application is installed and running. For example, the browser 118 executes code included in the web page, in JavaScript or any other suitable language, to determine the installation state of the desktop application. Typical installation states that are determined by the browser 118 include an indication that loading the asset was successful (indicating the desktop application is installed and running), an indication that loading the asset failed (in this case it is assumed that the desktop application is either not installed or not running), and an indication that an exception occurred during the loading of the asset. In the case of the indication of the error or the indication of the exception, the browser 118 provides a selectable indication to the user that lets the user choose to download and run the installer program to compete the software download.

By way of example, the loading of the test asset and determining the installation state of the desktop application is illustrated in the following JavaScript code:

```
function detect( ) {
    var im = document.createElement('img');
    im.onload = function ( ) {
        window.isDesktopApplicationAvailable = true;
        console.log('success');
    }
    im.onerror = function ( ) {
        window.isDesktopApplicationAvailable = false;
        console.log ('error');
    }
    im.onexception = function ( ) {
        window.isDesktopApplicationAvailable = false;
        console.log ('error');
    }
    im.src = 'https://detect.adobe.com:15151/detect.png';
    document.body.appendChild(im);
}
detect( );
```

Example Procedure

This section describes example procedures for detecting an application state using a DNS-controlled proxy in one or more embodiments. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks, and any number of the described procedures' operations can be combined in any order to implement the procedure, or an alternate procedure. In at least some embodiments the procedures may be performed by a suitably configured device, such as the example computing device 102 of FIG. 1 that makes use of the communication module 108.

Figure 3:
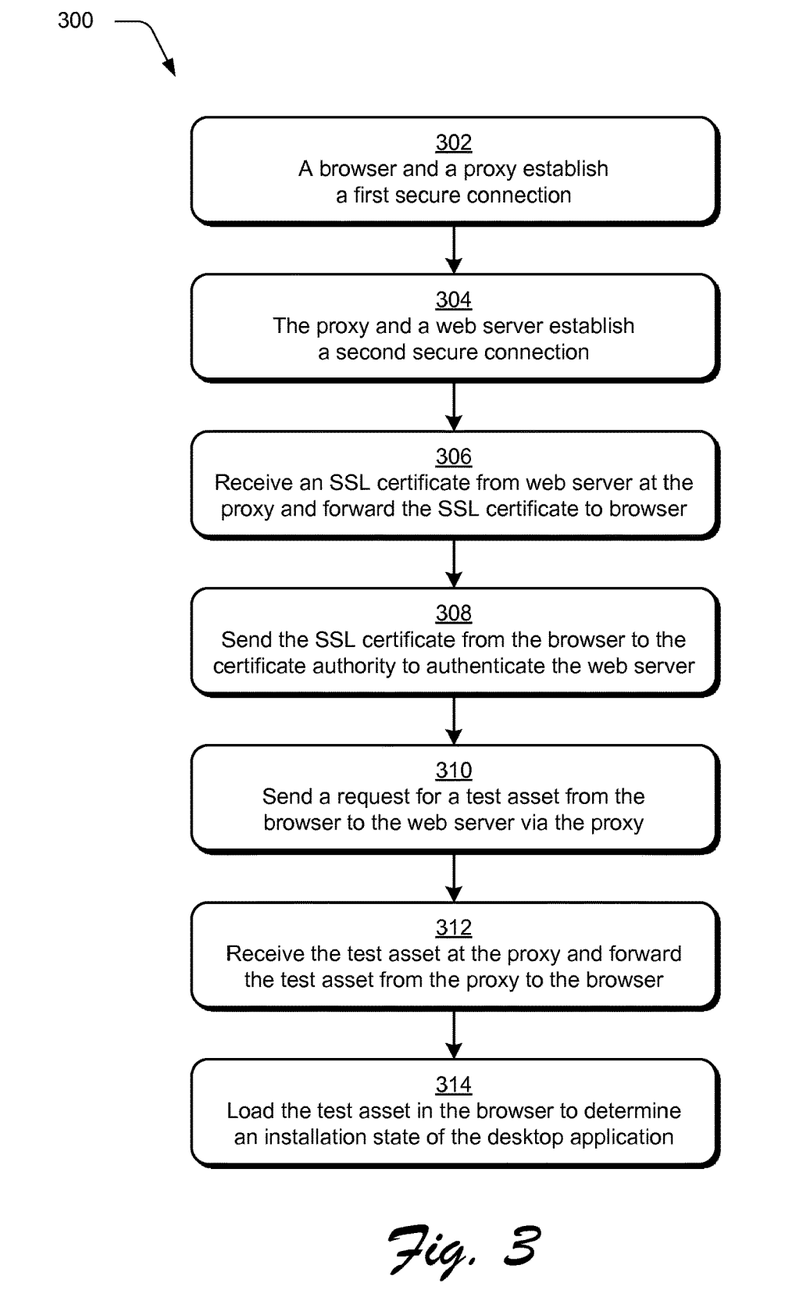
FIG. 3 is a flow diagram depicting an example procedure in accordance with one or more embodiments.

FIG. 3 depicts an example procedure 300 of detecting an application state using a DNS-controlled proxy. A proxy establishes a first secure connection with a browser using an address that was resolved, by a DNS server, from a first URL. For example at 302, the browser 118 resolves a detection URL by sending the detection URL to the DNS server 112, the DNS server 112 performs a lookup for the detection URL, the DNS server 112 responds with the IP address mapped to the detection URL, and the browser 118 receives the IP address mapped to the detection URL. The browser 118 uses the received IP address, of the localhost, to connect to a port of the proxy 122 and the proxy 122 and the browser 118 establish the first secure connection.

In response to the proxy and the browser establishing the first secure connection, the proxy establishes a second secure connection between the proxy and a web server. For example at 304, the proxy 122 resolves a connection URL by sending the connection URL to the DNS server 112, the DNS server 112 performs a lookup for the connection URL, the DNS server 112 responds with the IP address mapped to the connection URL, and the proxy 118 receives the IP address of the web server 124, which is mapped to the connection URL. The proxy 122 uses the received IP address of the web server 124 to establish the second secure connection.

The proxy receives an SSL certificate and a public encryption key from the web server, as a part of establishing the second secure connection. The proxy sends the received SSL certificate and public encryption key to the browser. For example at 306, the web server 124 sends the SSL certificate and the public encryption key to the proxy 122 as a part of establishing the second secure connection. The proxy 122 sends the received SSL certificate and the public encryption key to the browser 118 over the first secure connection.

The browser sends the received SSL certificate to a certificate authority for validation of the SSL certificate and in turn authentication of the identity of the web server. For example at 308, the browser 118 sends the received SSL certificate to the certificate authority 126, the certificate authority 126 determines that the SSL certificate is valid, the CA 126 sends an indication to the browser 118 that the certificate is valid, and the browser 118 receives the indication that the SSL certificate is valid. If the SSL certificate is accepted by the CA 126 as being valid, the browser 118 generates a symmetric encryption key, encrypts the symmetric encryption key with the received public encryption key, and sends the encrypted symmetric key to the web server 124, via the proxy 122, to cause the web server 124 to generate and return a session ID for encrypted end-to-end communication between the browser 118 and the web server 124.

The browser sends a request for a test asset to the proxy. The proxy forwards the request for the test asset from the browser to the web server. For example at 310, the browser 118 sends a request, such as an HTTP GET, POST, PUT, or HEAD request, for the test asset to the proxy 122. The proxy 122 sends the received request to the web server 124.

The web server sends an encrypted version of the test asset to the proxy. The proxy sends the received test asset to the browser. For example at 312, the web server 124 decrypts the request from the browser 118, encrypts the test asset with the secret key, and sends the encrypted test asset to the proxy 122. The proxy 122 sends the received response that includes the encrypted test asset to the browser 118. The browser 118 decrypts the encrypted test asset using the secret key.

The browser uses the test asset and/or an HTTP status code for the request to determine the installation state of the desktop application. For example at 314, the browser 118 executes executing a script included in a web page that attempts to load the decrypted test asset. The browser 118 loading the test asset successfully indicates that the desktop application 120 is installed and running. Alternatively, the browser 118 receives an HTTP status code from the HTTP Successful status code class 2xx from the web server 124, which indicates that the request was successful and indicates a secure connection has been established for the software download process and the desktop application 120 is installed and running. If the browser 118 fails to load the test asset, this indicates that the desktop application 120 is not installed and/or running. Alternatively, the browser 118 receives an HTTP status code from other than the HTTP Successful status code class 2xx, from the web server 124, indicating that the request was not successful.

Having described example procedures in accordance with one or more embodiments, consider now an example system and device that can be utilized to implement the various techniques described herein.

Example System and Device

Figure 4:
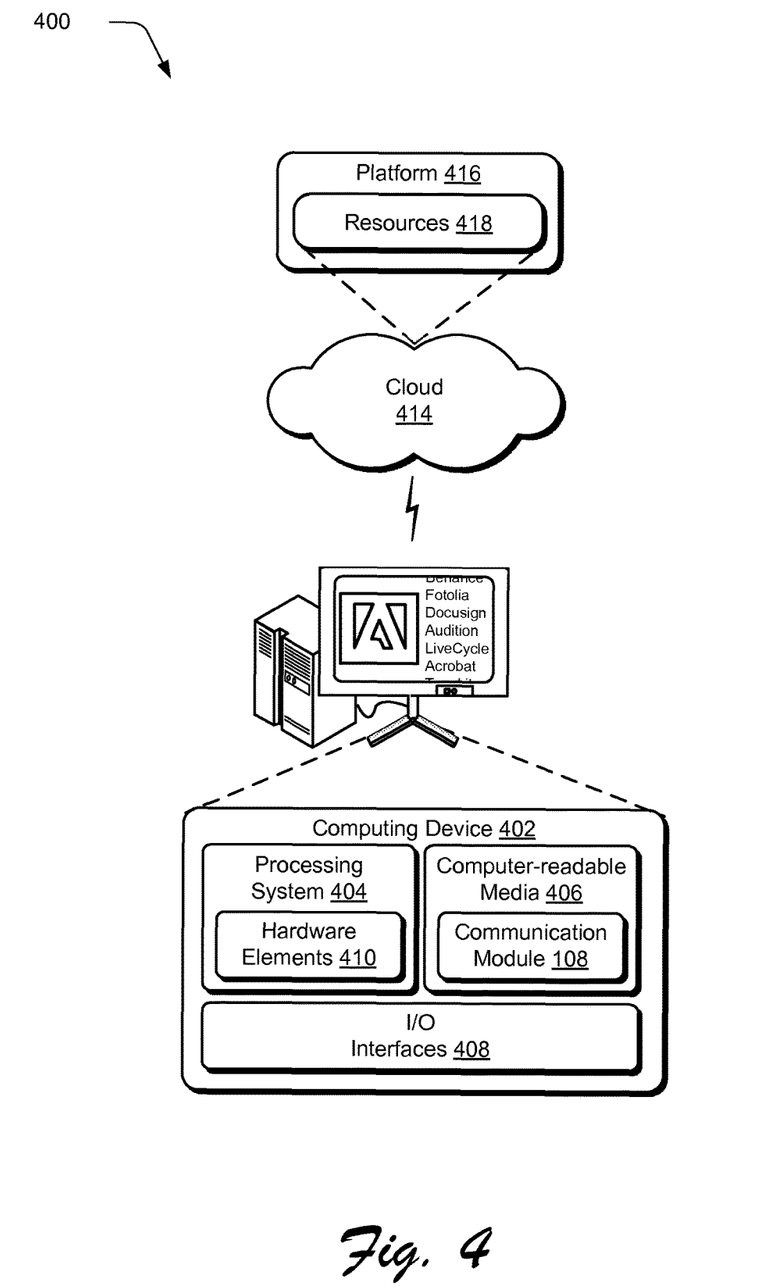
FIG. 4 illustrates an example system including various components of an example device that can be employed for one or more embodiments of detecting application state using a DNS-controlled proxy described herein.

FIG. 4 illustrates an example system generally at 400 that includes an example computing device 402 that is representative of one or more computing systems and/or devices that may implement the various techniques described herein. This is illustrated through inclusion of the communication module 108, which operates as described above. The computing device 402 may be, for example, a server of a service provider, a device associated with a client (e.g., a client device), an on-chip system, and/or any other suitable computing device or computing system.

The example computing device 402 illustrated includes a processing system 404, one or more computer-readable media 406, and one or more I/O interface 408 that are communicatively coupled, one to another. Although not shown, the computing device 402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 404 is representative of functionality to perform one or more operations using hardware. Accordingly, the processing system 404 is illustrated as including hardware elements 410 that may be configured as processors, functional blocks, and so forth. This may include implementation in hardware as an application specific integrated circuit or other logic device formed using one or more semiconductors. The hardware elements 410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 406 is illustrated as including memory/storage 412. The memory/storage 412 represents memory/storage capacity associated with one or more computer-readable storage media. The memory/storage component 412 may include volatile media (such as random access memory (RAM)) and/or nonvolatile media (such as read only memory (ROM), Flash memory, optical disks, magnetic disks, and so forth). The memory/storage component 412 may include fixed media (e.g., RAM, ROM, a fixed hard drive, and so on) as well as removable media (e.g., Flash memory, a removable hard drive, an optical disc, and so forth). The computer-readable media 406 may be configured to store the described communication module 108, including the browser 118, the desktop application 120, and/or the proxy 122. The computer-readable media 406 may be configured in a variety of other ways as further described below.

The input/output interface(s) 408 are representative of functionality to allow a user to enter commands and information to the computing device 402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 402. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 410 and the computer-readable media 406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of the computer-readable storage media 406 and/or by one or more hardware elements 410. The computing device 402 may be configured to implement particular instructions and/or functions corresponding to the software and/or hardware modules. Accordingly, implementation of a module that is executable by the computing device 402 as software may be achieved at least partially in hardware, e.g., through use of the computer-readable storage media 406 and/or the hardware elements 410 of the processing system 404. The instructions and/or functions may be executable/operable by one or more articles of manufacture (for example, one or more computing devices 402 and/or processing systems 404) to implement techniques, modules, and examples described herein.

The techniques described herein may be supported by various configurations of the computing device 402 and are not limited to the specific examples of the techniques described herein. This functionality may also be implemented all or in part through use of a distributed system, such as over a "cloud" 414 via a platform 416 as described below.

The cloud 414 includes and/or is representative of a platform 416 for resources 418. The platform 416 abstracts underlying functionality of hardware (e.g., servers) and software resources of the cloud 414. The resources 418 may include applications and/or data that can be utilized while computer processing is executed on servers that are remote from the computing device 402. Resources 418 can also include services provided over the Internet and/or through a subscriber network, such as a cellular or Wi-Fi network.

The platform 416 may abstract resources and functions to connect the computing device 402 with other computing devices or services. The platform 416 may also serve to abstract scaling of resources to provide a corresponding level of scale to encountered demand for the resources 418 that are implemented via the platform 416. Accordingly, in an interconnected device embodiment, implementation of functionality described herein may be distributed throughout the system 500. For example, the functionality may be implemented in part on the computing device 402 as well as via the platform 416 that abstracts the functionality of the cloud 414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of determining an installation state of a desktop application on a computer, the desktop application capable of managing installation of software applications if installed on the computer, the method comprising:

establishing a first secure connection between a browser and a proxy on the computer using a first address resolved from a first URL, the proxy installed on the computer by a software provider, executing a secure connection between the browser on the computer and the software provider;

establishing a second secure connection between the proxy and a web server of the software provider using a second address resolved from a second URL;

receiving by the proxy over the first secure connection between the browser and the proxy, a request for a test asset;

forwarding the request for the test asset, to the web server, over the second secure connection;

receiving the test asset from the web server over the second secure connection; and sending the received test asset to the browser, over the first secure connection, causing the browser to validate the test asset, by loading the test asset, to determine the installation state of the desktop application on the computer, the installation state indicating whether the desktop application is installed on the computer, wherein the desktop application manages the installation of the software applications of the software provider.

2. The method of claim 1, wherein the first URL is associated with a first subdomain and the second URL is associated with a second subdomain, and wherein the first subdomain and the second subdomain are both subdomains of a common top-level domain.

3. The method of claim 2, wherein a Secure Sockets Layer (SSL) certificate that authenticates the common top-level domain is usable to authenticate the first subdomain or the second subdomain.

4. The method of claim 3, the method further comprising:
receiving from the web server, over the second secure connection, the SSL certificate and a public encryption key associated with the common top-level domain; and
sending the received SSL certificate and the received public encryption key to the browser, over the first secure connection, effective to cause the browser to validate the SSL certificate.

5. The method of claim 1, wherein the desktop application initiates downloading a software application from the web server responsive to the determination of the installation state indicating that the desktop application is installed by the browser successfully loading the test asset.

6. A method of claim 1, wherein the determination of the installation state indicates that the desktop application is not installed, the method further comprising:
providing a selectable indication that an installer program is available to download the desktop application; and
in response to a selection of the indication by a user, downloading the installer program from the web server.

7. A method of claim 1, wherein the test asset comprises one of an image, text, or a video.

8. A system for determining an installation state of an application capable of managing installation of software applications on a computer, the system comprising:
a proxy installed on the computer by a software provider to provide a secure connection between a browser on the computer and the software provider configured to:
establish a first secure connection with a browser on a port of the proxy;
establish a second secure connection with a web server of the software provider;
the browser running on the computer configured to:
communicate a request over the first secure connection for a test asset that is usable to determine the installation state of the application capable of managing installation of the software applications on the computer, the request being effective to cause the proxy to send the request to the web server over the second secure connection;
receive the test asset from the web server, via the proxy; and
validate the received test asset by loading the test asset to determine the installation state of the application on the computer.

9. The system of claim 8, further comprising:
a Domain Name System (DNS) server configured to:
store a first DNS record for a detection URL, the first DNS record providing a mapping of the detection URL to a first Internet Protocol (IP) address for a localhost on the computer;
store a second DNS record for a connection URL, the second DNS record providing a mapping of the connection URL to a second IP address for a subdomain at the web server;
in response to a request from the browser to resolve the detection URL, send the first IP address to the browser; and
in response to a request from the proxy to resolve the connection URL, send the second IP address to the proxy.

10. A system of claim 9, wherein the detection URL and the connection URL are associated with respective subdomains, and the respective subdomains are both subdomains of a top-level domain, wherein a Secure Sockets Layer (SSL) certificate authenticates the top-level domain, and wherein the SSL certificate authenticates the respective subdomains of the top-level domain.

11. A system of claim 8, wherein the validation of the received test asset by the browser comprises successfully loading the test asset or receiving an HTTP status code from an HTTP 2xx Successful status code class in response to the communication of the request.

12. A system of claim 8, wherein the determination of the installation state indicates that the application is installed, and wherein the application initiates downloading a software application from the web server.

13. A system of claim 8, wherein the determination of the installation state indicates that the application is not installed, and the browser is further configured to:
provide a selectable indication to a user of the computer that an installer program is available to download and install the application; and
in response to a selection of the indication by the user, download the installer program from the web server.

14. A proxy apparatus usable by a computer system to determine an installation state of an application configured to manage installation of software applications on the computer system, the proxy apparatus configured to:
provide a TCP port used by a browser to establish a first secure connection with the proxy apparatus, the proxy apparatus comprising a TCP server with an Internet Protocol (IP) address that is a localhost address on the computer system;
establish a second secure connection with a web server;
forward a request for a test asset, received over the first secure connection from the browser, to the web server over the second secure connection through the proxy apparatus;
receive the test asset from the web server over the second secure connection; and
send the received test asset to the browser over the first secure connection, causing the browser to validate the test asset by loading the test asset to determine the installation state on the computer system of the application configured to manage installation of the software applications on the computer system.

15. The proxy apparatus of claim 14, wherein the received test asset is encrypted.

16. The apparatus of claim 14, wherein the browser requests the test asset responsive to running a script on a web page.

17. The apparatus of claim 14, wherein the test asset is an image.

18. The apparatus of claim 14, wherein the IP address is resolved from a DNS record for a detection URL, and the proxy apparatus is further configured to:
send a connection URL to a DNS server that is effective to cause the DNS server to resolve the connection URL to an IP address for the web server, the connection URL being associated with a subdomain for downloading the test asset to determine the installation state of the application; and receive the resolved IP address for the connection URL.

19. The apparatus of claim 18, wherein:

the detection URL and the connection URL are associated with respective subdomains;

the respective subdomains are both subdomains of a top-level domain;

the SSL certificate authenticates the top-level domain; and the SSL certificate authenticates the respective subdomains of the top-level domain.

20. The apparatus of claim 14, further configured to:

receive, from the web server, a Secure Sockets Layer (SSL) certificate and a public encryption key associated with the web server; and send the received SSL certificate and the received public encryption key to the browser effective to cause the browser to validate the SSL certificate.

* * * * *